US009853747B2

(12) United States Patent
Shariat et al.

(10) Patent No.: US 9,853,747 B2
(45) Date of Patent: Dec. 26, 2017

(54) APPARATUS AND METHOD FOR CONTROLLING INTERFERENCE

(71) Applicant: Samsung Electronics Co., Ltd, Gyeonggi-do (KR)

(72) Inventors: Mehrdad Shariat, Middlesex (GB); Milos Tesanovic, Middlesex (GB)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/406,547

(22) Filed: Jan. 13, 2017

(65) Prior Publication Data

US 2017/0207863 A1 Jul. 20, 2017

(30) Foreign Application Priority Data

Jan. 15, 2016 (GB) .................................. 1600800.5

(51) Int. Cl.
H04B 1/00 (2006.01)
H04B 15/00 (2006.01)
H04B 17/336 (2015.01)
H04L 27/02 (2006.01)

(52) U.S. Cl.
CPC ........... *H04B 15/00* (2013.01); *H04B 17/336* (2015.01); *H04L 27/02* (2013.01)

(58) Field of Classification Search
CPC ..... H04B 15/00; H04B 17/336; H04B 17/345
(Continued)

(56) References Cited

U.S. PATENT DOCUMENTS

2008/0225752 A1* 9/2008 Kwon ................. H04W 72/048
370/254

2012/0094702 A1* 4/2012 Furueda ................ H04W 72/02
455/501
(Continued)

FOREIGN PATENT DOCUMENTS

WO 2015076579 A1 5/2015

OTHER PUBLICATIONS

Combined Search and Examination Report dated May 27, 2016 in connection with British Patent Application No. GB1600800.5, 5 pages.
Sungnam Hong, et al., "FQAM: A Modulation Scheme for Beyond 4G Cellular Wireless Communication Systems", 2013 IEEE Globecom Workshops, 2013, 6 pages.
Sungnam Hong, et al.: A Modulation Technique for Active Interference Design Under Downlink Cellular OFDMA Networks, 2014 IEEE Wireless Communications and Networking Conference, 2014, 6 pages.
(Continued)

Primary Examiner — Ayodeji Ayotunde

(57) ABSTRACT

The present disclosure relates to a pre-5th-Generation (5G) or 5G communication system to be provided for supporting higher data rates Beyond 4th-Generation (4G) communication system such as Long Term Evolution (LTE). An apparatus includes at least one transceiver, and at least one processor, coupled to the at least one transceiver, configured to determine at least one terminal having a value lower than or equal to a threshold among terminals in a coverage of the base station, the value indicating a signal quality, to identify another value for indicating interference in the coverage, to identify a resource pool allocated for the determined at least one terminal and shared with neighboring base stations around the base station based on determining that the another value exceeds another threshold, and to transmit a message for instructing to modulate a signal to be communicated via the identified resource pool based on a frequency and quadrature-amplitude modulation (FQAM) scheme in the neighboring base stations.

20 Claims, 8 Drawing Sheets

(58) Field of Classification Search
USPC .......................................................... 455/63.1
See application file for complete search history.

(56) References Cited

U.S. PATENT DOCUMENTS

| | | | |
|---|---|---|---|
| 2014/0187255 A1* | 7/2014 | Dimou ................ | H04W 72/082 |
| | | | 455/452.2 |
| 2014/0269992 A1 | 9/2014 | Hong et al. | |
| 2015/0230118 A1 | 8/2015 | Lim et al. | |
| 2016/0165471 A1* | 6/2016 | Bontu ................... | H04L 1/0026 |
| | | | 370/241 |
| 2016/0294523 A1 | 10/2016 | Jeong et al. | |

OTHER PUBLICATIONS

Samsung, "5G Vision", Feb. 2015, 16 pages.
ETSI TS 136 300 V8.9.0, "LTE; Evolved Universal Terrestrial Radio Access (E-UTRA), and Evolved Universal Terrestrial Radio Access Network (E-UTRAN); Overall Description; Stage 2, (3GPP TS 36.300 version 8.9.0 Release 8)", Jul. 2009, 163 pages.
ETSI TS 136 423 V12.3.0, "LTE; Evolved Universal Terrestrial Radio Access Network (E-UTRAN); X2 Application Protocol (X2AP), (3GPP TS 36.423 version 12.3.0 Release 12)", Sep. 2014, 153 pages.
Sungnam Hong, et al., "Frequency and Quadrature-Amplitude Modulation for Downlink Cellular OFDMA Networks", IEEE Journal on Selected Areas in Communications, vol. 32, No. 6, Jun. 2014, 12 pages.

* cited by examiner

APPARATUS AND METHOD FOR CONTROLLING INTERFERENCE

CROSS-REFERENCE TO RELATED APPLICATIONS AND CLAIM OF PRIORITY

The present application is related to and claims priority under 35 U.S.C. §119(a) to U.K. Patent Application No. GB1600800.5, which was filed in the Great Britain Patent Office on Jan. 15, 2016, the entire content of which is hereby incorporated by reference.

TECHNICAL FIELD

The present disclosure generally relates to wireless communication and, more particularly, to an apparatus and method for controlling an interference.

BACKGROUND

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Meanwhile, in an environment having a low Signal-to-Interference-plus-Noise Ratio (SINR), a method for modulating a signal which will be transmitted or received based on a Frequency and Quadrature-Amplitude Modulation (FQAM) is being discussed. However, since a signal modulated based on the FQAM technique occupies a wider bandwidth than a signal modulated based on a QAM technique and the like, the performance degradation due to a change in the channel of the signal based on the FQAM technique is larger than the signal modulated based on the QAM technique and the like. Therefore, a method for solving the problem is required.

SUMMARY

To address the above-discussed deficiencies, it is a primary object to provide an apparatus of a base station in a wireless environment, the apparatus comprising at least one transceiver, and at least one processor, coupled to the at least one transceiver, configured to determine at least one terminal having a value lower than or equal to a threshold among terminals in a coverage of the base station, the value indicating a signal quality, to identify another value for indicating interference in the coverage, to identify a resource pool allocated for the determined at least one terminal and shared with neighboring base stations around the base station based on determining that the another value exceeds another threshold, and to transmit a message for instructing to modulate a signal to be communicated via the identified resource pool based on a frequency and quadrature-amplitude modulation (FQAM) scheme in the neighboring base stations.

According to various embodiments of the present disclosure, a method of a base station in a wireless environment, the method comprising determining at least one terminal having a value lower than or equal to a threshold among terminals in a coverage of the base station, the value indicating a signal quality, identifying another value for indicating interference in the coverage, identifying a resource pool allocated for the determined at least one terminal and shared with neighboring base stations around the base station based on determining that the identified another value exceeds another threshold, and transmitting a message for instructing to modulate a signal to be communicated via the identified resource pool based on a frequency and quadrature-amplitude modulation (FQAM) scheme in the neighboring base stations.

According to various embodiments of the present disclosure, a non-transitory computer-readable storage medium for storing one or more programs for executing an operation of determining at least one terminal having a value lower than or equal to a threshold among terminals in a coverage of the base station, the value indicating a signal quality, identifying another value for indicating interference in the coverage, identifying a resource pool allocated for the determined at least one terminal and shared with neighboring base stations around the base station based on determining that the identified another value exceeds another threshold, and transmitting a message for instructing to modulate a signal to be communicated via the identified resource pool based on a frequency and quadrature-amplitude modulation (FQAM) scheme in the neighboring base stations.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
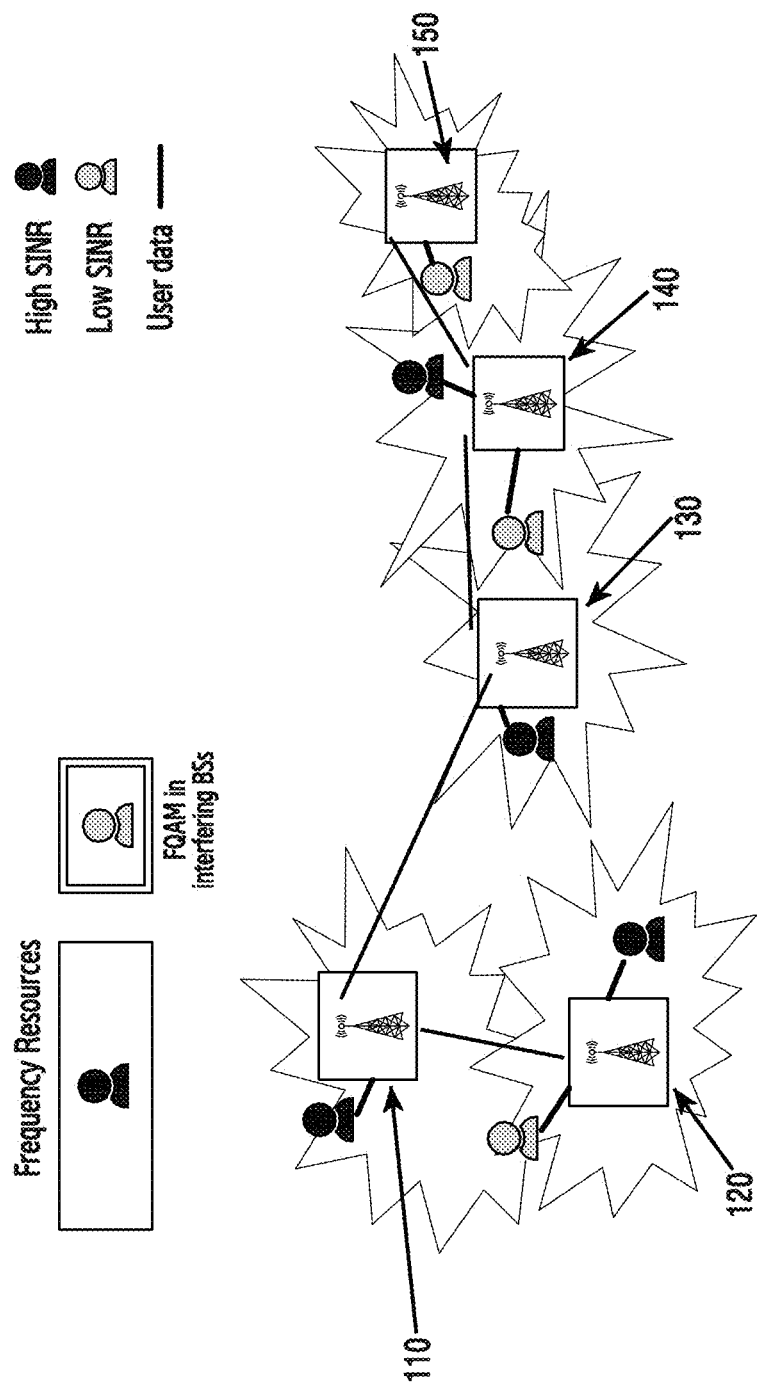
FIG. 1 illustrates an example of a network according to various embodiments of the present disclosure.

FIGS. 1 through 7B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

One of the key requirements for 5G telecommunication systems is the enhancement of what is classically known as "cell-edge" performance, to ensure that every user is supported with consistent experience anywhere in the network. Conventional approaches to enhance the performance mainly focus on managing interference (e.g. interference cancellation or interference avoidance), by dealing with interference as a Gaussian element. However, it is proved that the worst-case additive noise in wireless networks with respect to the channel capacity has a Gaussian distribution. Recent studies show that combining quadrature-amplitude modulation (QAM) with frequency-shift keying (FSK) into what is termed as frequency and quadrature-amplitude modulation (FQAM) can be advantageous to change the pattern of inter-cell interference (ICI) into non-Gaussian and to improve the performance of users in low SINR regime in target cells.

While FQAM is beneficial to improve Signal to Noise Ratio (SINR) at the cell-edge, a price is paid in terms of system throughput in cells causing interference where FQAM is applied (as the presence of FSK in the heart of FQAM implies one frequency tone will be active per time instance, limiting the spectrum utilization factor per cell).

It is an aim of embodiments of the present disclosure to provide an improved approach to interference management in systems which utilize or can utilize FQAM.

In general, a sub-set of users in interfering cells can potentially contribute towards higher aggregate system throughput if they can still rely on conventional QAM, since this does not utilize the FSK element of FQAM, which can have the effect of limiting the spectrum utilization factor per cell, as noted previously. As a result, a resource management framework is provided where clusters of mutually interfering cells (and the users therein) are grouped accordingly. The high-SINR users in a target cell do not need active interference management. Thus, neighboring cells could still rely on conventional modulation schemes on resources allocated to them whereas the low-SINR ones can benefit from the new type of modulation scheme in interfering cells and on designated resources (in frequency/time) to improve their respective performance.

A benefit of providing such a framework is to achieve more consistent performance and user quality of experience as the users move across the network from contention-free zones closer to certain Base stations (BSs) towards critical zones with contention from neighboring cells. In particular, this type of interference management can enable better abstraction of MAC and resource management design from PHY layer, leading to a more flat architectural design for air interface (AIF).

It is notable that incorporating FQAM modulation as interference management scheme according to an embodiment of the present disclosure is different from conventional Adaptive Modulation and Coding schemes (AMCs). Firstly, AMC is used as a link adaptation mechanism to match the modulation and coding and other relevant parameters to the degradation of channel arising from several factors besides ICI (including small scale fading, shadowing and distance-dependent pathloss) rather than tackling and rectifying the interference issue, which is what embodiments of the present disclosure do. Secondly, unlike AMC that is applied to the users of a target cell, FQAM according to embodiments of the present disclosure is applied in interfering cells to achieve active interference management. Thirdly, embodiments of the present disclosure provide a system-wide approach, designing an array of extensions on top of said use of FQAM, which detail how the location of and size of the common reserved spectrum for low-SINR User Equipment (UEs) in target and neighboring cells is determined and updated.

In broad terms, embodiments of the disclosure operate as follows:

1. Per target cell, users are split into high-SINR versus low-SINR ones; this can be done e.g. per Transmission Time Interval (TTI) or on longer intervals.

2. Low-SINR users in a target cell need an active interference management from interfering cells to improve the performance.

3. The interference management can be realized by utilizing FQAM in neighboring interfering cells on resources (in frequency domain) that are reserved for low-SINR users in a target cell.

4. The way of applying different modulation schemes to different frequency ranges can additionally be affected by the type of synchronization/co-ordination that exists between cells in question.

Synchronization refers to the alignment of clock signals across neighboring base stations' radio circuitry. Synchronous operation is not always mandatory (e.g. LTE in the FDD mode), although in some cases this would be important (e.g. LTE in TDD mode of operation).

Coordination refers to the required signaling between neighboring cells to implement different radio resource management functionalities (e.g. Inter-Cell Interference Coordination (ICIC), load management, mobility management or energy saving). Normally, specific interfaces (e.g.

X2 in LTE) are employed to exchange such coordination messages (e.g. X2AP messages). The type of co-ordination is determined by the extent of such signaling that is available or that is being used.

Further details of the implementation will be given in the description which follows.

There are three particular system configurations which are envisaged and which are described below: light, medium and high coordination.

The type of possible coordination is dictated by several factors including the existence of a centralized controller, existence and status of inter-BS interfaces (e.g. X2 or any Xn links) as well as network configuration of such links (e.g. full mesh, part mesh, star, chain). As an example, in absence of a centralized controller but in a mesh topology, light coordination is better suited (or perhaps the only one possible) to limit the volume and frequency of signaling messages whereas in presence of a centralized controller and in a star topology, high coordination can be possible.

Light Coordination

If cells are tightly synchronized but lightly co-ordinated then the proposed mechanism is particularly well suited. Synchronization is a well-known concept and refers to alignment of clock signals across neighboring base stations' radio circuitry. LTE does not mandate synchronous operation (e.g. in the FDD mode), although in TDD mode of operation this would be necessary and synchronization limits are set for different modes of operation.

Tight synchronization generally requires a grandmaster clock, but this need not mean that the cells are co-ordinated when it comes to interference management—i.e. the exchange of interference management information may not be implemented, in which case, this would represent a case of light co-ordination.

If cells are not synchronized, the cell edge interference can be naturally lower as it is already partly randomized due to lack of synchronization. Therefore, the decision of whether to apply the mechanism according to an embodiment of the disclosure can be based on additional factors, such as the level of inter-cell interference perceived by the users as well as the target Quality of Service (QoS) level.

Although embodiments of the disclosure can be applied to either synchronized or non-synchronized cases with light coordination, in the case of non-synchronized cells, cell edge interference can be a mixture of QAM and FQAM (but still potentially lower than plain QAM due to interference randomization, which means that application of an embodiment of the disclosure can be advantageous even in such cases).

The interference management scheme according to an embodiment of the disclosure is mutually incorporated in the above lightly-coordinated cases among cells by reserving a common resource pool that will be agreed in a static or semi-static manner. Any low-SINR users can be served from the common reserved pool wherein all neighboring BSs apply FQAM as modulation for active interference management as shown in FIG. 1.

FIG. 1 illustrates an example of a network according to various embodiments of the present disclosure. Each BS 110-150 has within its area one or more users. Some of these users (shown darker) experience high SINR and enjoy a good quality of service. However, some users (shown lighter), positioned at or near the boundary between two cells (shown darker) experience low SINR and can experience degraded performance.

The size and location of the common reserved pool with respect to the total system Bandwidth (BW) can be predetermined and entered into a look-up table, minimizing the exchange of information between neighboring cells. This minimizes the signaling overhead which would otherwise be required if the information was updated regularly.

Alternatively (or in addition), the location of the common reserved pool can be determined using a frequency-hopping pattern known to all the participating cells, again minimizing the need for information exchange while ensuring frequency diversity. This provides an additional degree of freedom for scheduling of users in neighboring cells. This is since the location of the common reserved pool changes, a neighboring cell is not required to assign FQAM to the same users all the time; rather than shifting around the frequency allocations for users who are assigned FQAM, it can instead assign FQAM to users who happen to be allocated resources in the common reserved pool.

The coordination between neighboring cells, by using the above method is simplified by not exchanging interference management information (such as X2 RNTP in LTE or any X2AP messages in general), thereby reducing signaling and delay. Any remaining signaling occurs on X2 (or any Xn) interface (such as e.g. mobility management information) defined between neighboring cells as explicitly shown in FIG. 1 between BSs 110-120, 110-130,130-140 and 140-150.

Defining a common reserved pool and sharing the relevant information (e.g. the location and size of the pool with respect to the whole assigned spectrum per BS/cell or the frequency hopping pattern) between neighboring BSs, ensures that participating BSs can assign FQAM as needed, without needing to assign it to all users in that cell.

The decision on the location and size of the common spectrum pool (in low coordination cases) can be made in a distributed (but offline manner) between interfering cells, whereas the intelligence on application of FQAM and serving low SINR users resides in resource scheduler of interfering BSs and target BS, respectively (e.g. 110 to 150 in FIG. 1).

Medium Coordination

As an extension of the scheme used in the case of light coordination, to more dynamic (coordinated) cases, the size of common resource pool between neighboring cells can be dynamically adjusted based on the level of load in this area, i.e. if more users are concentrated in critical zones, or if the level of interference experienced by certain users is above a certain threshold regardless of the absolute number of users, the reserved pool can be expanded whereas in low-load/low-interference (acceptable QoS) scenarios with less contention, the reserved pool can be reduced.

Additional parameters can influence the dynamism in the size of reserved pool according to this disclosure, including: X2 (or any Xn) link status (availability of and delay on the link; e.g. if X2 link is unavailable or if the exchange of interference management information over it would incur unacceptable delay then light coordination is better suited), spectrum characteristics (such as quality due to existing interference or changing propagation environment).

The configuration of FIG. 1 applies to this scenario also. Therefore, embodiments of the disclosures can be implemented similarly within interfering and target BSs with extra signaling to capture the dynamism in the size of reserved pool (e.g. 110 to 150 in FIG. 1).

High Coordination

Instead of defining a common resource pool across all cells in question, each interfering cell can adjust the size of a reserved pool based on the level of interference introduced to other cells in highly coordinated cases. Therefore, the reserved pool (with FQAM) will not be uniform across interfering cells, i.e. high interferers can have larger reserved FQAM pool to protect neighboring cells whereas others can have smaller reserved pool with FQAM.

A flexible reserved pool as above requires more individualized interference updates from neighboring cells and so requires greater signaling between cells.

If an interferer receives multiple notifications from neighboring victim cells, it should set the size of reserved pool based on the request with maximum demand.

Figure 2:
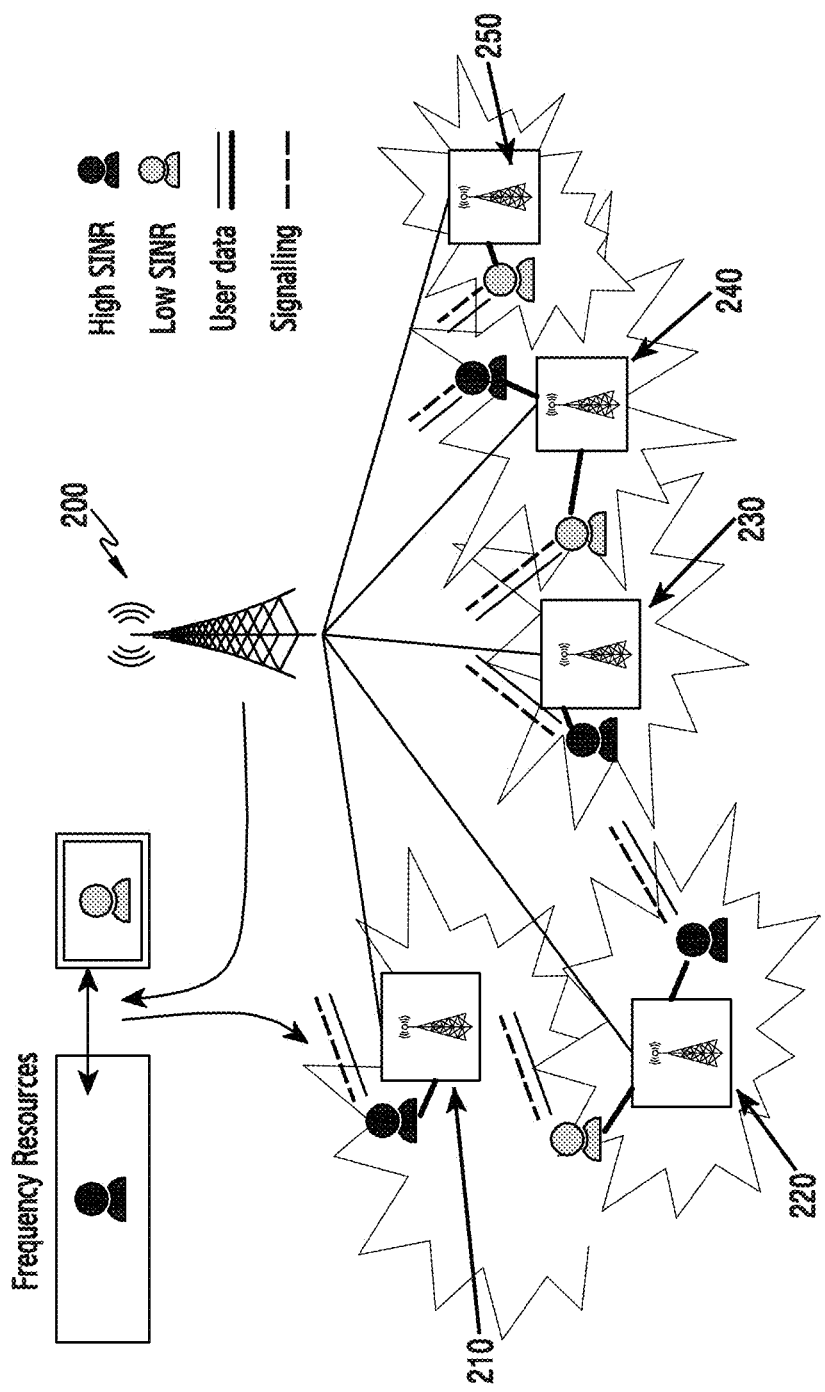
FIG. 2 illustrates another example of a network according to various embodiments of the present disclosure.

FIG. 2 illustrates another example of a network according to various embodiments of the present disclosure.

The notification between adjacent cells can be on X2 (or any Xn interface) similar to Light or Medium coordination as shown in FIG. 1. However, as the application of FQAM per cell will be based on interference updates from neighboring cells, a centralized control is better suited here. This can be facilitated by dual (multi)-connectivity via the primary cell (e.g. macro BS 200 in LTE) as shown in FIG. 2. In other words, the primary cell(s) can achieve a higher visibility of interference pattern per contending zone via UE reports. As a result, they can act as controller and facilitate setting the size of reserved pool per contending zone (or per interferer) by sending a broadcast (or customized) message(s) to such secondary cells.

The system of FIG. 2 is similar to that shown in FIG. 1, and BSs 210-250 correspond to BSs 110-150, with the addition of BS 200 as primary cell and controller plus an additional signaling channel as shown by the dotted lines to enable dual (multi)-connectivity. Inter-BS interfaces have been removed in FIG. 2 for the sake of clarity. However, this is for the convenience of description, and BSs in FIG. 2 can be connected through interfaces such as an X2 interface, an internal interface, or the like.

The decision on the location and size of reserved spectrum pool per cell (in high coordination case) can be made centrally within resource scheduler of primary cells (e.g. 200 in FIG. 2) and exchanged with interfering cells whereas the intelligence on application of FQAM and serving low SINR users still resides in the resource scheduler of interfering BSs and target BS, respectively (e.g. 210 to 250 in FIG. 2).

Figure 3:
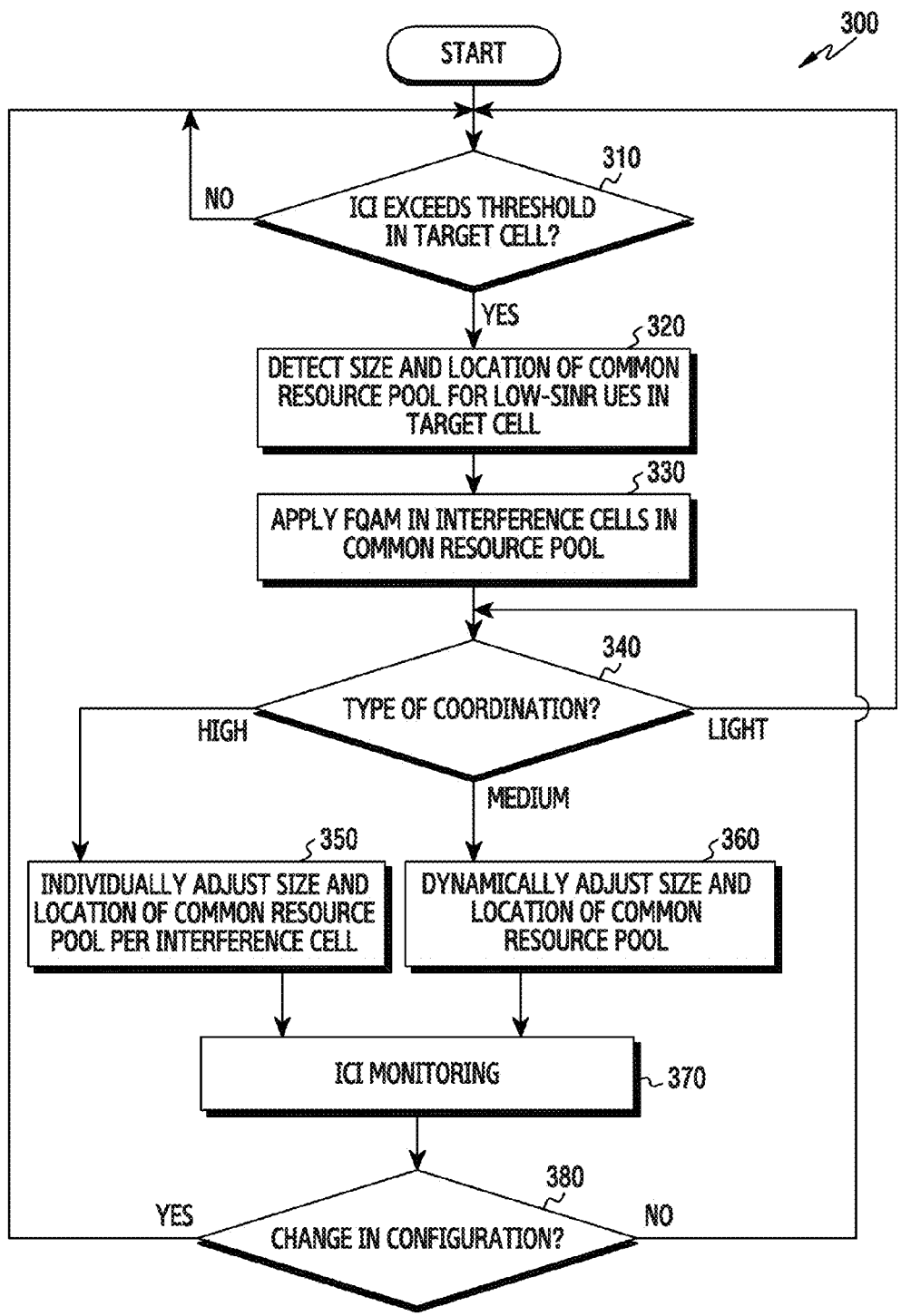
FIG. 3 is a flowchart illustrating operations according to various embodiments of the present disclosure.

FIG. 3 shows a flowchart which sets out the steps of a method according to an embodiment of the disclosure.

The process begins at step 300. At step 310, a check is made to determine if the ICI exceeds a predefined threshold in the target cell. In other words, the target cell can check whether the ICI level in the target cell exceeds a threshold. The ICI level can be available from channel quality indicator information capable of being used as a part of general signaling between the UE and the BS. This information is available from Channel Quality Indicator information which is made available as part of the routine signaling between UE and BS. If the ICI does not exceed the predefined threshold, then the process returns to the start 300.

If the ICI does exceed the predefined threshold, then at step 320 the size and location of the common resource pool for low-SINR UEs in the target cell is detected. As mentioned previously, this information can be stored in a look up table.

At step 330 FQAM is then applied in interfering cells, neighboring the target cell, using information concerning the common resource (e.g. on location, size of the pool or frequency hopping pattern).

At step 340, the type of co-ordination (i.e. high, medium or low, as described previously) is determined by reference to certain parameters or network properties, such as: existence of a centralized controller, existence and status of X2 (or any Xn) links as well as the type of network of X2 links (e.g. is it full mesh?), type of messages exchanged on these links. If it is determined that the cells in question are lightly coordinated, then the process returns to the start 300.

If it is determined that the cells in question have a medium level of coordination, then at step 360, the size and location of the common resource pool is dynamically adjusted, as set out previously.

If it is determined that the cells in question have a high level of coordination, then at step 350, the size and location of the reserved pool is individually adjusted per interferer, as set out previously.

After steps 350 and 360, flow continues to step 370 where the ICI is monitored. At step 380, it is determined if there is a change in the configuration of network, for example, the default location of spectrum pool, the hopping pattern etc., requiring a restart of the devised procedure. If there is a change, then flow returns to the start 300 and the entire process begins again. If there is no change, then flow returns to step 340 and continues from there.

As described above, according to an aspect of the present disclosure, a method of managing interference effects in a target cell of a communication network can include: monitoring an inter-cell interference level in the target cell; determining whether the inter-cell interference level exceeds a predetermined threshold; when the inter-cell interference level exceeds the predetermined threshold, detecting a size and location of a common resource pool for a User Equipment (UE) having a low SINR in the target cell; and applying FQAM to neighboring cells in the common resource pool.

In some embodiments, the method can further include determining a degree of adjustment in the communication network in order to determine whether there are relatively high, medium, or light degrees of adjustment.

In some embodiments, the method can include, when the degree of adjustment is determined to be light, continuously monitoring the inter-cell interference level in the target cell.

In some embodiments, the method can include, when the degree of adjustment is determined to be medium, dynamically adjusting the size and location of the common resource pool, and continuously monitoring the inter-cell interference level in the target cell.

In some embodiments, the method can include, when the degree of adjustment is determined to be high, individually adjusting the size and location of the resource pool by each intervenor, and continuously monitoring the inter-cell interference level in the target cell.

In some embodiments, the method can include: determining whether there is a change in the configuration of the communications network; and when there is a change, returning to the step of monitoring the inter-cell interference level in the target cell, and when there is no change, returning to the step of determining the degree of adjustment in the communication network.

An apparatus according to another aspect of the present disclosure can be arranged to perform the method described above. For example, the apparatus can be one of a base station (BS), a base station controller (BSC), or a baseband unit (BBU).

A computer readable medium or circuit according to still another aspect of the present disclosure can store a computer program for performing the method described above.

Figure 4:
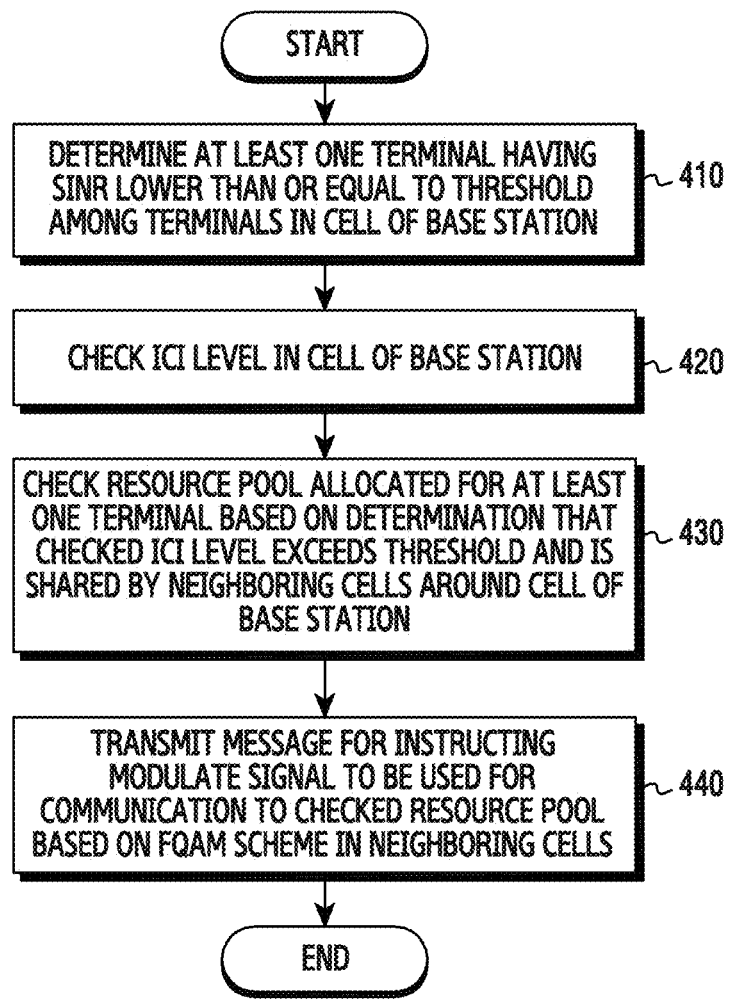
FIG. 4 is a flowchart illustrating an example of operations of a base station according to various embodiments of the present disclosure.

FIG. 4 is a flowchart illustrating operations of a base station according to various embodiments of the present disclosure.

Referring to FIG. 4, in step 410, the base station can determine at least one terminal having an SINR below a threshold, among terminals in the cell of the base station. The SINR can be an example of a value for indicating a signal quality or signal quality information (SQI). The value for indicating the signal quality or the SQI can comprise signal to noise ratio (SNR), carrier to interference plus noise ration (CINR), carrier to noise ratio (CNR). In some embodiments, the SINR can be changed to SNR, CINR, CNR. At least one terminal having an SINR lower than or equal to the threshold can be a low SINR terminal. In some embodiments, the base station can determine an SINR of each of the terminals, based on a measurement report which is transmitted from terminals in the cell of the base station and includes information on a Received Signal Strength Indicator (RSSI) or Received Signal Received Quality (RSRQ). In some other embodiments, the base station can recognize the SINR of each of the terminals by receiving a signal including information on the SINR of each of the terminals, which is transmitted from each of the terminals in the cell of the base station.

In step 420, the base station can check an ICI level in the cell of the base station. In other words, the base station can monitor the ICI level in the cell of the base station. The ICI level can be an example of a value for indicating the interference. In other words, the base station according to various embodiments can determine or identify the interference associated with the base station or caused in a coverage of the base station by using various methods. Thus, the base station according to various embodiments can process various parameters indicating the interference instead of the ICI level.

In some embodiments, steps 410 and 420 can be performed in reverse order or performed at the same time. In other words, FIG. 4 illustrates a case where step 420 is performed after step 410 is performed, but this is only an illustrative example, steps 410 and 420 can be performed in any order or performed at the same time.

In step 430, the base station can check a resource pool, which is allocated for (i.e., allocated for a low-SNIR terminal) the at least one terminal based on a determination that the checked ICI level exceeds a threshold, and is shared by neighboring cells around the cell of the base station. In other words, the BS can check resources overlapping between the cell of the base station and the neighboring cells among resources that can be used by the base station.

In step 440, the base station can transmit a message for instructing to modulate a signal to be used for communication to the checked resource pool based on the FQAM scheme in the neighboring cells. The message can be transmitted to neighboring base stations included in the neighboring cells, or can be transmitted to terminals which are located in a boundary between the neighboring cells and the cell of the base station and receive services from the neighboring base stations.

As described above, the base station according to various embodiments of the present disclosure can transmit a message for instructing to modulate a signal to be used for communication to a resource being overlapped between the cell of the base station and the neighboring cells, so as to reduce the interference caused between the cell and the neighboring cells. In addition, the base station can secure an available frequency spectrum by specifying a signal to be modulated based on the FQAM scheme to the resource being overlapped.

Figure 5:
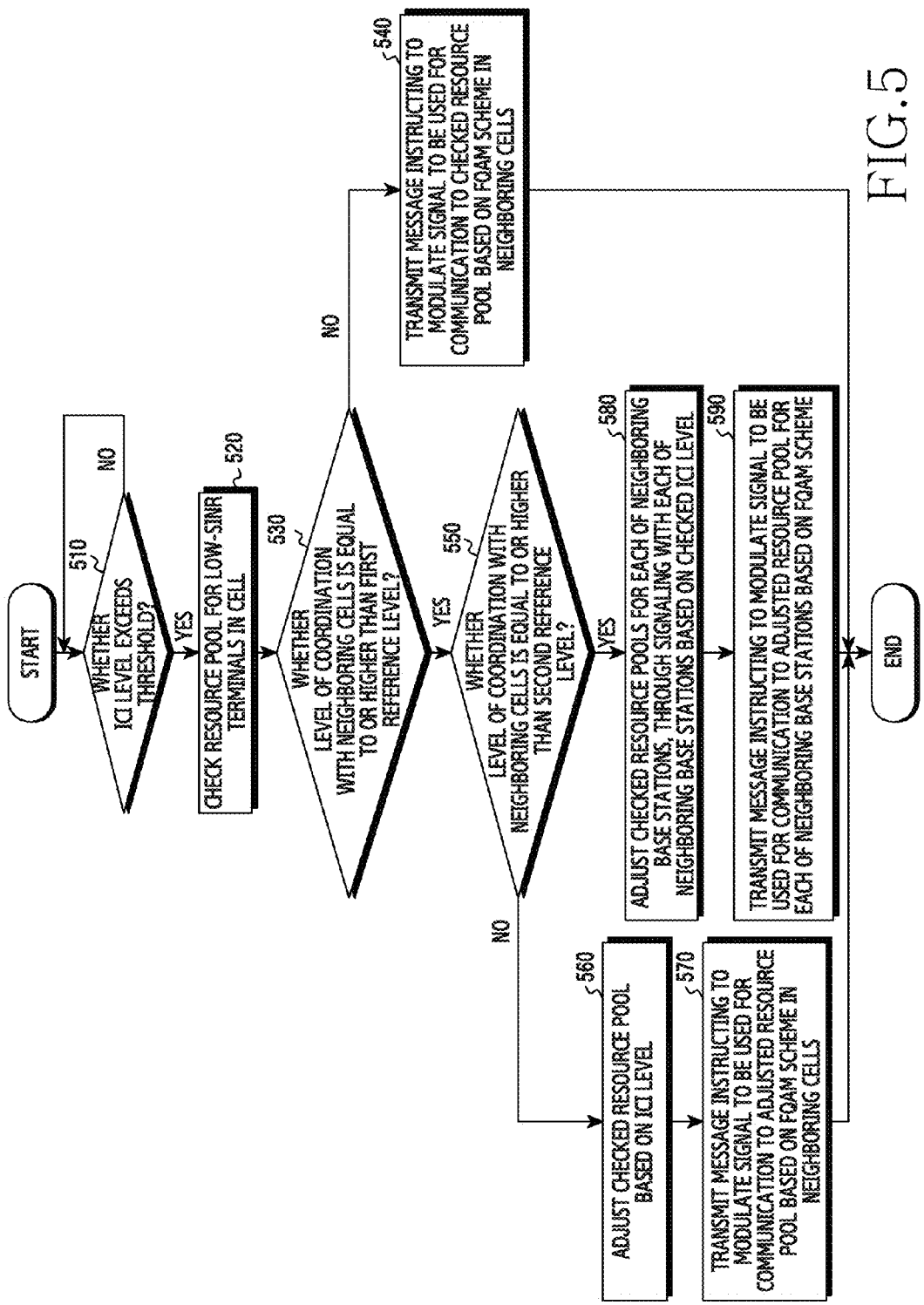
FIG. 5 is a flowchart illustrating another example of operations of a base station according to various embodiments of the present disclosure.

FIG. 5 is a flowchart illustrating another example of operations of a base station according to various embodiments of the present disclosure.

Referring to FIG. 5, in step 510, the base station can determine whether the ICI level exceeds a threshold. When the ICI level does not exceed the threshold, the base station can continuously monitor (or check) the ICI level of the cell of the base station. On the other hand, when the ICI level exceeds the threshold, the base station can perform operation 520.

In step 520, the base station can check a resource pool for low-SINR terminals in the cell of the base station. The resource pool can be a resource pool that is allocated, designated, or reserved for the low-SINR terminals. In some embodiments, the resource pool can be overlapped with or shared by resource pools of neighboring cells around a cell of the base station. For example, the resource pool can be indicated by a frequency hopping pattern or the like, and can be shared by the neighboring cells. In some other embodiments, the resource pool can be stored in the base station through a pre-stored table or the like. In some other embodiments, the resource pool can be updated at predetermined intervals.

In step 530, the base station can determine whether the level of coordination with the neighboring base stations included in the neighboring cells is equal to or higher than a first reference level. Specifically, the base station can determine the level of coordination with the neighboring base stations based on whether signaling with the neighboring base stations is easy, a delay required for signaling with the neighboring base stations, and the like. When the level of coordination is lower than the first reference level, the base station can perform an operation of step 540. On the other hand, when the level of coordination is equal to or higher than the first reference level, the base station can perform an operation of step 550.

In step 540, the base station can transmit a message instructing to modulate a signal to be used for communication to the checked resource pool based on the FQAM scheme in the neighboring cells. For example, the base station can transmit, to terminals that receive services from the neighboring base stations, a message for instructing the neighboring base stations to modulate a signal to be transmitted to the checked resource pool based on the FQAM scheme. For another example, the base station can transmit, to the neighboring base stations, a message for instructing to modulate a signal which will be transmitted from the neighboring base stations to the checked resource pool based on the FQAM scheme.

In step 550, the base station can determine whether the level of coordination with the neighboring base stations included in the neighboring cells is equal to or higher than a second reference level. The second reference level can be set to a value higher than the first reference level. In other words, the base station can divide the degree of coordination or level of coordination between the base station and the neighboring base stations into three levels (light, medium, high). FIG. 5 illustrates a case where the level of coordination is divided into three levels, but this is only an example for explanation. In some embodiments, the base station can divide the level of coordination into two levels. When the level of coordination is below the second reference level, the base station can perform an operation of step 560. Alternatively, when the level of coordination is equal to or higher than the second reference level, the base station can perform an operation of step 580.

In step 560, the base station can adjust the checked resource pool based on the ICI level. In other words, the base station can adjust the size or location of the checked resource pool based on the degree of interference between a cell including the base station and neighboring cells. In some embodiments, the base station can adjust the checked resource pool based on load information on the base station or one or more of the neighboring base stations.

In step 570, the base station can transmit a message instructing to modulate a signal to be used for communication to the adjusted resource pool based on the FQAM scheme in the neighboring cells. As described above, the base station can transmit the message to the neighboring base stations and/or terminals that receive a service from the neighboring base stations and are located at the boundary between the cell and the neighboring cells.

In step 580, the base station can adjust the checked resource pool for each of the neighboring base stations through signaling with each of the neighboring base stations based on the determined ICI level. When the level of the coordination is equal to or higher than the second reference level, the base station can easily perform signaling with each of the neighboring base stations, so that the base station can perform signaling for individually adjusting the checked resource pool by each of the neighboring base stations.

In step 590, the base station can transmit a message instructing to modulate a signal to be used for communication to a resource pool designated for each of the neighboring base stations based on the FQAM scheme. In some embodiments, the message can be transmitted through a signaling procedure in step 580. In some other embodiments, the message can be transmitted to terminals located at a boundary between the cell and the neighboring cells. In still other embodiments, the message can be transmitted to the neighboring base stations.

As described above, a base station according to various embodiments of the present disclosure can reduce the ICI using resource pools that are shared by neighboring base stations around the base station, and allocated or reserved for low-SINR terminals. In addition, the base station can adaptively control the degree of adjustment of the resource pool based on the type or relationship of connection between the base station and neighboring base stations around the base station.

As described above, according to various embodiments of the present disclosure, a method for a base station (evolved node B: eNB) in a wireless environment can include: determining at least one terminal having a Signal-to-Interference-Plus-Noise Ratio (SINR) lower than or equal to a threshold, among terminals in a cell including the base station; checking an Inter-Cell Interference (ICI) level in the cell; checking a resource pool allocated for the determined at least one terminal and shared by neighboring cells around the cell based on a determination that the checked ICI level exceeds the threshold; and transmitting a message for instructing to modulate a signal to be used for communication to the checked resource pool based on a Frequency and Quadrature-Amplitude Modulation (FQAM) scheme in the neighboring cells.

In some embodiments, the method can further include: modulating a signal to be transmitted to the checked resource pool in the cell based on a scheme that is different from the FQAM scheme; and transmitting the modulated signal to the determined at least one terminal.

In some embodiments, the method can further include checking a level of coordination between neighboring base stations included in the neighboring cells and the base station. For example, the checking of the level of coordination can include checking the level of coordination between neighboring base stations and the base station based on the states of interfaces between the base station and the neighboring base stations, the structures of the interfaces, or types of messages communicated through the interfaces. For another example, transmitting a message for instructing to modulate a signal to be used for communication to the checked resource pool based on a Frequency and Quadrature-Amplitude Modulation (FQAM) scheme in the neighboring cells can include: when the checked level of coordination is below a first reference level, transmitting a message for instructing to modulate the signal to be used for communication to the checked resource pool based on the FQAM scheme in the neighboring cells. In addition, the method can further include: when the checked level of coordination is equal to or higher than the first reference level, adjusting the checked resource pool based on the checked ICI level; and transmitting a message for instructing to modulate the signal to be used for communication to the adjusted resource pool based on the FQAM scheme. In addition, the method can further include: when the checked level of coordination is equal to or higher than a second reference level, which is higher than the first reference level, adjusting the checked resource pool for each of the neighboring base stations, through signaling with each of the neighboring base stations, based on the checked ICI level; and transmitting a message for instructing to modulate the signal to be used for communication on the resource pool that is adjusted for each of the neighboring base stations, based on the FQAM scheme.

In some embodiments, the checking of the resource pool can include: detecting a size of the resource pool and a location of the resource pool so as to check the resource pool.

In some embodiments, the method can further include: when a configuration of a network including the base station and neighboring stations included in the neighboring cells is changed, checking the ICI level again within the cell.

In some embodiments, the method further include: determining at least one terminal having an SINR lower than or equal to the threshold, among terminals within the cell, at Transmission Time Intervals (TTI).

Figure 6:
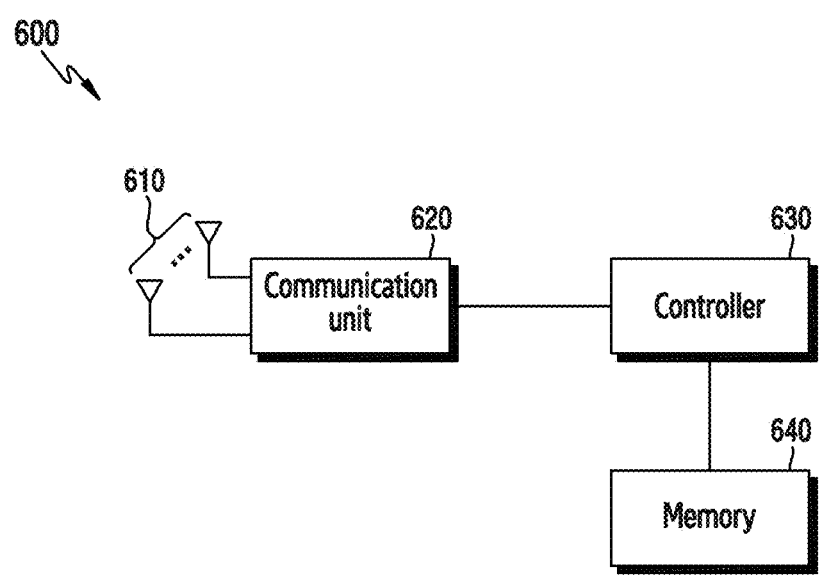
FIG. 6 illustrates an example of a functional configuration of an apparatus according to various embodiments of the present disclosure.

FIG. 6 illustrates an example of a functional configuration of an apparatus according to various embodiments of the present disclosure. The functional configuration can be included in one of the base stations and terminals illustrated in FIG. 1 to FIG. 5.

Referring to FIG. 6, an apparatus 600 can include an antenna 610, a communication unit 620, a controller 630, and a memory 640.

The antenna 610 can include one or more antennas. The antenna 610 can be configured to be suitable for a Multiple Input Multiple Output (MIMO) scheme.

The communication unit 620 can perform functions for transmitting or receiving a signal through a wireless channel.

The communication unit 620 can perform a function of converting between a baseband signal and a bit stream according to the physical layer specification of a system. For example, when transmitting data, the communication unit 620 can generate complex symbols by encoding and modulating a transmission bit stream. For example, when receiving data, the communication unit 620 can demodulate and decode the baseband signal to reconstruct to a reception bit stream.

The communication unit 620 can up convert a baseband signal to an RF band signal and transmit the same through the antenna 610. The communication unit 620 can down convert the RF band signal received through the antenna 610 to a baseband signal. For example, the communication unit 620 can include a transmission filter, a reception filter, an amplifier, a mixer, an oscillator, a Digital to Analog Convertor (DAC), an Analog to Digital Convertor (ADC), or the like.

The communication unit 620 can be operatively coupled to the controller 630.

The communication unit 620 can include at least one transceiver.

The controller 630 can control general operations of the apparatus 600. For example, the controller 630 can transmit or receive a signal through the communication unit 620. The controller 630 can write data in the memory 640 and read data recorded in the memory 640. To this end, the controller 630 can include at least one processor. For example, the controller 630 can include a Communication Processor (CP) that performs a control for communication, and an Application Processor (AP) that controls a higher layer, such as an application program.

The controller 630 can be configured to implement procedures and/or methods proposed in the present disclosure.

The memory 640 can store a control command code, control data, or user data for controlling the apparatus 600. For example, the memory 640 can include an application, an operating system (OS), a middleware, and a device driver.

The memory 640 can include at least one of a volatile memory and a nonvolatile memory. The volatile memory can include a Dynamic RAM (DRAM), a Static RAM (SRAM), a Synchronous DRAM (SDRAM), a Phrase-change RAM (PRAM), a Magnetic RAM (MRAM), a Resistive RAM (RRAM), Ferroelectric RAM (FeRAM), and the like. The nonvolatile memory can include a read only memory (ROM), a programmable ROM (PROM), an electrically programmable ROM (EPROM), an electrically erasable ROM (EEPROM), a flash memory, and the like.

The memory 640 can include a non-volatile medium such as a Hard Disk Drive (HDD), a Solid State Disk (SSD), an embedded Multi Media Card (eMMC), and a Universal Flash Storage (UFS).

The memory 640 can be operatively coupled to the controller 630.

Figure 7A:
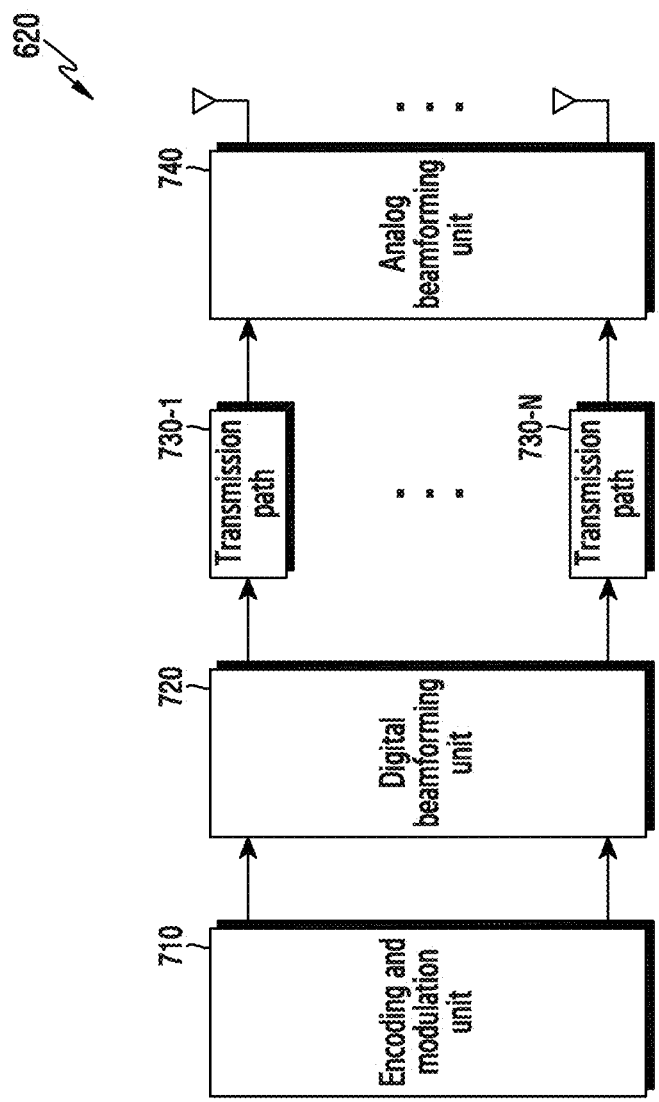
FIG. 7A illustrates an example of a functional configuration of a communication unit according to various embodiments of the present disclosure.

FIG. 7A illustrates an example of a functional configuration of a communication unit according to various embodiments of the present disclosure. The functional configuration of the communication unit can be included in the communication unit 620 of the apparatus shown in FIG. 6.

Referring to FIG. 7A, the communication unit 620 can include an encoding and modulation unit 710, a digital beamforming unit 720, a plurality of transmission paths 730-1 to 730-N, and an analog beamforming unit 740.

The encoding and modulation unit 710 can perform channel encoding. For the channel encoding, at least one of a low density parity check (LDPC) code, a convolutional code, a polar code, and a turbo code can be used. The encoding and modulation unit 710 can generate modulation symbols by performing constellation mapping.

The digital beamforming unit 720 can perform beamforming on digital signals (e.g., modulation symbols). To this end, the digital beamforming unit 720 can multiply beamforming weights by the modulation symbols. The beamforming weights are used to change the size and phase of a signal, and can be referred to as "precoding matrix", "precoder", and the like. The digital beamforming unit 720 can output the modulation symbols on which digital beamforming has been performed to at least one of the plurality of transmission paths 730-1 to 730-N. In some embodiments, the modulation symbols can be multiplexed according to a Multiple Input Multiple Output (MIMO) transmission scheme. In some other embodiments, the digital beamforming unit 720 can output the same modulation symbols on which digital beamforming has been performed, which are used for a diversity gain, to at least one of the plurality of transmission paths 730-1 to 730-N.

The plurality of transmission paths 730-1 to 730-N can convert the digital signals on which digital beamforming has been performed into analog signals. To this end, each of the plurality of transmission paths 730-1 to 730-N can include an inverse fast Fourier transform (IFFT) operation unit, a cyclic prefix (CP) insertion unit, a digital analog converter (DAC), and an up-conversion unit. The CP insertion unit is for an orthogonal frequency division multiplexing (OFDM) scheme, and can be excluded when another physical layer modulation scheme (for example, filter bank multi-carrier (FBMC)) is applied. In other words, the plurality of transmission paths 730-1 to 730-N can provide independent signal processing processes for a plurality of streams (or output modulation symbols) generated through the digital beamforming. Depending on the implementation scheme, some common elements of the plurality of transmission paths 730-1 to 730-N can be used.

The analog beamforming unit 740 can perform beamforming with respect to an analog signal. To this end, the analog beamforming unit 740 can multiply beamforming weights by the analog signals. The beamforming weights can be parameters for changing the magnitude and phase of the signal. Specifically, the analog beamforming unit 740 can be configured as shown in FIG. 7B according to the connection structure between the plurality of transmission paths 730-1 to 730-N and the antennas.

Figure 7B:
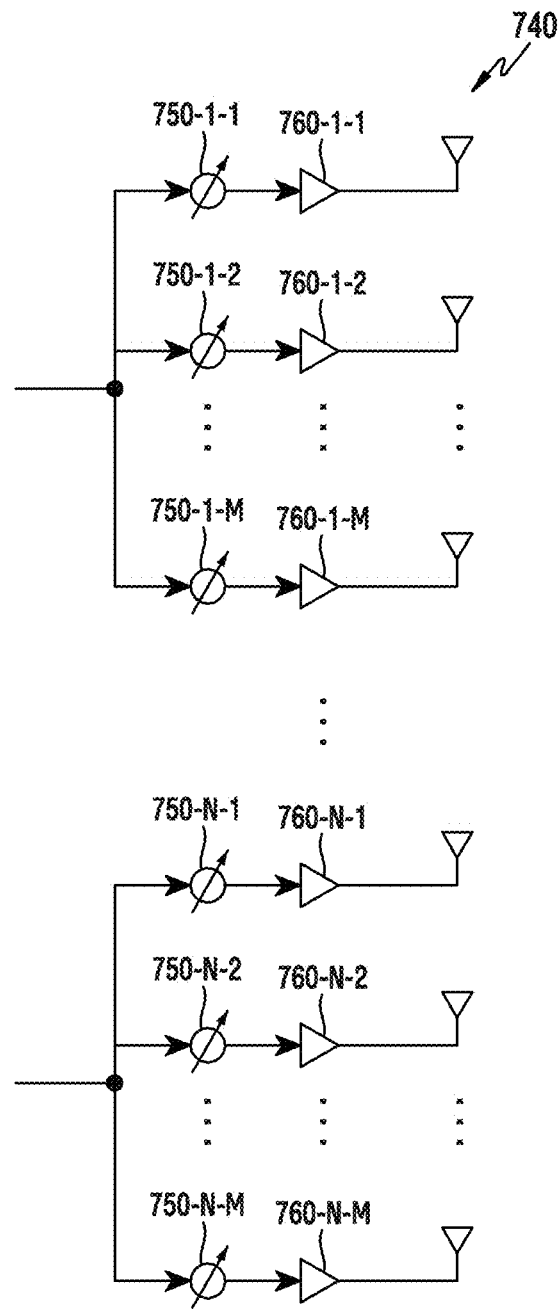
FIG. 7B illustrates an example of a functional configuration of an analog beamforming unit according to various embodiments of the present disclosure.

FIG. 7B illustrates an example of a functional configuration of an analog beamforming unit according to various embodiments of the present disclosure. The functional configuration can be included in the analog beamforming unit 740 of FIG. 7A.

Referring to FIG. 7B, signals input to the analog beamforming unit 740 can be processed to have phase/size conversion and amplification operations and transmitted through antennas. Here, the signals of the respective paths can be transmitted through different sets of antennas, i.e., antenna arrays. In consideration of the process of the signal input through the first path, the signal can be converted into a signal stream having different or the same phase/size by phase/size conversion units 750-1-1 to 750-1-M, amplified by amplifiers 760-1-1 through 760-1-M, and then transmitted through the antennas.

As described above, a base station (evolved node B: eNB) apparatus in a wireless environment according to various embodiments of the present disclosure can include: at least one transceiver; and at least one processor which is coupled to the at least one transceiver, and configured to perform control so as to determine at least one terminal having a Signal-to-Interference-Plus-Noise Ratio (SINR) lower than or equal to a threshold value among terminals in a cell including the base station, check an Inter-Cell Interference (ICI) level in the cell, check a resource pool allocated for the determined at least one terminal and shared by neighboring cells around the cell based on a determination that the checked ICI level exceeds the threshold value, and transmit a message instructing to modulate a signal to be used for communication to the checked resource pool based on a Frequency and Quadrature-Amplitude Modulation (FQAM) scheme in the neighboring cells.

In some embodiments, the at least one processor can be further configured to perform control so as to modulate a signal to be transmitted to the checked resource pool based on a scheme different from the FQAM scheme in the cell, and transmit the modulated signal to the determined at least one terminal.

In some embodiments, the at least one processor can be further configured to check a level of coordination between neighboring base stations included in the neighboring cells and the base station. For example, wherein the at least one processor can be configured to check the level of coordination between the neighboring base stations and the base station, based on the state of interfaces between the base station and the neighboring base stations, the structure of the interfaces, or a type of a message to be used for communication through the interfaces. For another example, the at least one processor can be configured to perform control, when the checked level of coordination is below a first reference level, so as to transmit a message for instructing to modulate a signal to be used for communication to the checked resource pool in the neighboring cells based on the FQAM scheme. In addition, the at least one processor can be configured to perform control, when the checked level of coordination is equal to or higher than the first reference level, so as to adjust the checked resource pool based on the checked ICI level, and transmit a message for instructing to modulate the signal to be used for communication to the adjusted resource pool based on the FQAM scheme. In addition, the at least one processor can be configured to perform control, when the checked level of coordination is equal to or higher than a second reference level, which is higher than the first reference level, so as to adjust the checked resource pool for each of the neighboring base stations based on the checked ICI level through signaling with each of the neighboring base stations, and transmit a message for instructing to modulate the signal to be used for communication on the resource pool that is adjusted for each of the neighboring base stations based on the FQAM scheme.

In some embodiments, the at least one processor can be configured to detect a size of the resource pool and a location of the resource pool, so as to check the resource pool.

In some embodiments, the at least one processor can be further configured to determine at least one terminal having an SINR lower than or equal to the threshold, among the terminals within the cell, at Transmission Time Intervals (TTI).

In some embodiments, the at least one processor can be configured to, when a configuration of a network including the base station and neighboring stations included in the neighboring cells is changed, check the ICI level again within the cell.

Embodiments of the present disclosure have been presented in terms of a method. As set out, the method can be implemented by various hardware items in the network. The particular apparatus can be participating cell controllers, meaning base stations in case of 4G, but also possibly including base station controllers in older systems such as 2G/3G; it can also reside in the base band unit BBU for a Cloud RAN type network, and in the case of the centralized case also in the controller node.

For the distributed case, this software handles input such as cell interference reports from its own users as well as input from cells it is connected to. It uses this information together with various other information such as QoS requirements, frequency band occupancy, and other information as described previously. In the centralized case, in some embodiments the software in the participating cell controllers can be quite "dumb" and simply collect data which is then processed in the controlling node, as set out previously.

Software implementing the method of embodiments of the disclosure in the participating cell controllers needs to then be able to handle inputs from the controller node and implement any changes in the radio usage parameters for its users. The main activity of the software residing in the participating cell controllers is radio resource management, in line with embodiments of the disclosure.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, can be combined in any combination, except combinations where at least some of such features and/or steps are mutually exclusive.

Each feature disclosed in this specification (including any accompanying claims, abstract and drawings) can be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this specification (including any accompanying claims, abstract and drawings), or to any novel one, or any novel combination, of the steps of any method or process so disclosed.

Although the present disclosure has been described with an exemplary embodiment, various changes and modifications can be suggested to one skilled in the art. It is intended that the present disclosure encompass such changes and modifications as fall within the scope of the appended claims.

What is claimed is:

1. An apparatus of a base station in a wireless environment, the apparatus comprising:
   at least one transceiver; and
   at least one processor, coupled to the at least one transceiver, configured to:
      determine at least one terminal having a first value lower than or equal to a threshold among terminals in a coverage of the base station, the first value indicating a signal quality;
      identify a second value for indicating interference in the coverage;
      identify a resource pool allocated for the determined at least one terminal and shared with neighboring base stations around the base station based on determining that the second value exceeds another threshold; and
      transmit a message for instructing to modulate a signal to be communicated via the identified resource pool based on a frequency and quadrature-amplitude modulation (FQAM) scheme in the neighboring base stations.

2. The apparatus of claim 1, wherein the at least one processor is further configured to modulate a signal to be transmitted with the identified resource pool from the base station based on a scheme that is different from the FQAM scheme, and control the transceiver to transmit the modulated signal to the determined at least one terminal.

3. The apparatus of claim 1, wherein the at least one processor is further configured to identify a level of coordination between neighboring base stations and the base station.

4. The apparatus of claim 3, wherein the at least one processor is configured to identify the level of coordination based on states of interfaces between the base station and the neighboring base stations, structures of the interfaces, or types of messages communicated through the interfaces.

5. The apparatus of claim 3, wherein the at least one processor is configured to control the transceiver to transmit, when the identified level of coordination is below a first reference level, a message for instructing to modulate a signal to be used for communication using the identified resource pool based on the FQAM scheme in the neighboring base stations.

6. The apparatus of claim 5, wherein the at least one processor is configured to adjust, when the identified level of coordination is equal to or higher than the first reference level, the identified resource pool based on the identified second value, and control the transceiver to transmit a message for instructing to modulate a signal to be used for communication using the adjusted resource pool based on the FQAM scheme.

7. The apparatus of claim 6, wherein the at least one processor is configured to adjust, when the identified level of coordination is equal to or higher than a second reference level, which is higher than the first reference level, the identified resource pool for each of the neighboring base stations based on the identified second value through signaling with the neighboring base stations, and control the transceiver to transmit a message for instructing to modulate a signal to be used for communication on the resource pool that is adjusted for each of the neighboring base stations based on the FQAM scheme.

8. The apparatus of claim 1, wherein the at least one processor is configured to identify the resource pool by detecting a size of the resource pool and a location of the resource pool.

9. The apparatus of claim 1, wherein the at least one processor is configured to determine at least one terminal having the first value lower than or equal to the threshold, among the terminals within the coverage, at transmission time intervals (TTI).

10. The apparatus of claim 1, wherein the at least one processor is configured to identify again the second value within the coverage when a configuration of a network including the base station and the neighboring stations is changed.

11. A method for operating a base station in a wireless environment, the method comprising:
   determining at least one terminal having a first value lower than or equal to a threshold among terminals in a coverage of the base station, the first value indicating a signal quality;
   identifying a second value for indicating interference in the coverage;
   identifying a resource pool allocated for the determined at least one terminal and shared with neighboring base stations around the base station based on determining that the identified second value exceeds another threshold; and
   transmitting a message for instructing to modulate a signal to be communicated via the identified resource pool based on a frequency and quadrature-amplitude modulation (FQAM) scheme in the neighboring base stations.

12. The method of claim 11, further comprising:
   modulating a signal to be transmitted with the identified resource pool from the base station based on a scheme that is different from the FQAM scheme; and
   transmitting the modulated signal to the determined at least one terminal.

13. The method of claim 11, further comprising:
   identifying a level of coordination between neighboring base stations and the base station.

14. The method of claim 13, wherein identifying the level of the coordination comprises:
   identifying the level of coordination based on states of interfaces between the base station and the neighboring base stations, structures of the interfaces, or types of messages communicated through the interfaces.

15. The method of claim 13, wherein transmitting comprises transmitting, when the identified level of coordination is below a first reference level, a message for instructing to modulate a signal to be used for communication using the identified resource pool based on the FQAM scheme in the neighboring base stations.

16. The method of claim 15, further comprising:
   adjusting, when the identified level of coordination is equal to or higher than the first reference level, the identified resource pool based on the identified second value; and
   transmitting a message for instructing to modulate a signal to be used for communication using the adjusted resource pool based on the FQAM scheme.

17. The method of claim 16, further comprising:
   adjusting, when the identified level of coordination is equal to or higher than a second reference level, which is higher than the first reference level, the identified resource pool for each of the neighboring base stations based on the identified second value through signaling with the neighboring base stations; and
   transmitting a message for instructing to modulate a signal to be used for communication on the resource pool that is adjusted for each of the neighboring base stations based on the FQAM scheme.

18. The method of claim 11, wherein identifying the resource pool comprises identifying the resource pool by detecting a size of the resource pool and a location of the resource pool.

19. The method of claim 11, further comprising:
   identifying again the second value within the coverage when a configuration of a network including the base station and the neighboring stations is changed.

20. A non-transitory computer-readable storage medium for storing one or more programs for executing operations of:
   determining at least one terminal having a first value lower than or equal to a threshold among terminals in a coverage of the base station, the first value indicating a signal quality;
   identifying a second value for indicating interference in the coverage;
   identifying a resource pool allocated for the determined at least one terminal and shared with neighboring base stations around the base station based on determining that the identified second value exceeds another threshold; and transmitting a message for instructing to modulate a signal to be communicated via the identified resource pool based on a frequency and quadrature-amplitude modulation (FQAM) scheme in the neighboring base stations.

* * * * *